US010885661B2

(12) United States Patent
Lanka et al.

(10) Patent No.: US 10,885,661 B2
(45) Date of Patent: Jan. 5, 2021

(54) LOCATION DETERMINATION

(71) Applicant: NCR Corporation, Atlanta, GA (US)

(72) Inventors: Pavani Lanka, Saradhi Nilayam (IN); Samak Radha, Malkajgiri (IN)

(73) Assignee: NCR Corporation, Atlanta, GA (US)

( * ) Notice: Subject to any disclaimer, the term of this patent is extended or adjusted under 35 U.S.C. 154(b) by 129 days.

(21) Appl. No.: 16/221,469

(22) Filed: Dec. 15, 2018

(65) Prior Publication Data
US 2020/0193631 A1 Jun. 18, 2020

(51) Int. Cl.
*G06K 9/00* (2006.01)
*G06T 7/73* (2017.01)
*G06T 7/00* (2017.01)

(52) U.S. Cl.
CPC ............ *G06T 7/73* (2017.01); *G06K 9/00664* (2013.01); *G06K 9/00771* (2013.01); *G06T 7/97* (2017.01); *G06T 2207/30232* (2013.01)

(58) Field of Classification Search
CPC .. G06T 7/73; G06T 7/97; G06T 7/292; G06T 19/003; G06T 2207/30232; G06T 2207/30241; G06T 2207/20132; G06K 9/0064; G06K 9/00771; G06K 9/4604; G06K 9/00201; G06K 9/00228; G06K 9/46; G06K 9/00691; G06K 9/00369; G06K 9/6232; H04N 7/18; H04N 7/181; H04N 7/183; H04W 4/021; H04W 4/025; H04W 4/02; G06Q 10/04; G06Q 10/087; G06Q 20/20; G06Q 30/0639; G06Q 30/00; G06Q 30/02; G06Q 30/0201; G06Q 30/0202; G06Q 30/0631; G06Q 30/0255; G06Q 30/0269; G06Q 30/0251
See application file for complete search history.

(56) References Cited

U.S. PATENT DOCUMENTS

| | | | | |
|---|---|---|---|---|
| 10,282,852 | B1* | 5/2019 | Buibas | G06T 7/246 |
| 10,290,031 | B2* | 5/2019 | Reid | G06K 9/00335 |
| 10,657,373 | B2* | 5/2020 | Wexler | H04L 65/4069 |
| 10,713,670 | B1* | 7/2020 | Moon | G06Q 30/0201 |
| 2008/0193009 | A1* | 8/2008 | Sonoura | G01S 5/12 382/153 |
| 2015/0026010 | A1* | 1/2015 | Ellison | G06Q 30/0631 705/26.41 |
| 2015/0363798 | A1* | 12/2015 | Aihara | G06Q 30/0201 705/7.29 |
| 2016/0146614 | A1* | 5/2016 | Gupta | G01C 21/206 701/461 |
| 2016/0203499 | A1* | 7/2016 | Yamashita | G06Q 30/0201 705/7.29 |
| 2017/0255947 | A1* | 9/2017 | Horikawa | G06Q 30/0201 |
| 2018/0276480 | A1* | 9/2018 | Peterson | G06K 9/00369 |
| 2020/0020113 | A1* | 1/2020 | Buibas | G06K 9/00201 |

(Continued)

*Primary Examiner* — Jose L Couso
(74) *Attorney, Agent, or Firm* — Schwegman, Lundberg & Woessner

(57) ABSTRACT

Disclosed are systems and methods for determining a location of a customer within a store. The systems and methods may include receiving at least one image of an item located in the store. The item may be held by the customer. The systems and methods may also include creating a feature vector. The feature vector may store features of the at least one image of the item. The location of the customer may be determined using features stored in the feature vector.

20 Claims, 3 Drawing Sheets

(56) References Cited

U.S. PATENT DOCUMENTS

2020/0134701 A1\* 4/2020 Zucker .................. G06Q 20/12
2020/0134862 A1\* 4/2020 Zucker .................. G06T 7/292
2020/0184270 A1\* 6/2020 Omer ................... G06Q 20/208

\* cited by examiner

LOCATION DETERMINATION

BACKGROUND

Computer vision and image processing techniques have advanced in recent years. However, one difficult and unsolved processing task includes knowing when to associate one tracked item with another tracked item. This has been particularly difficult in frictionless store systems where decisions have to be made from the images as to whether an item captured in a first part of a store is the same item captured in a second part of the store.

SUMMARY

Disclosed are systems and methods for determining a location of a customer within a store. The systems and methods may include receiving at least one image of an item located in the store. The item may be held by the customer. The systems and methods may also include creating a feature vector. The feature vector may store features of the at least one image of the item. The location of the customer may be determined using features stored in the feature vector.

BRIEF DESCRIPTION OF THE FIGURES

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure, and such exemplifications are not to be construed as limiting the scope of the disclosure in any manner.

DETAILED DESCRIPTION

Figure 1:
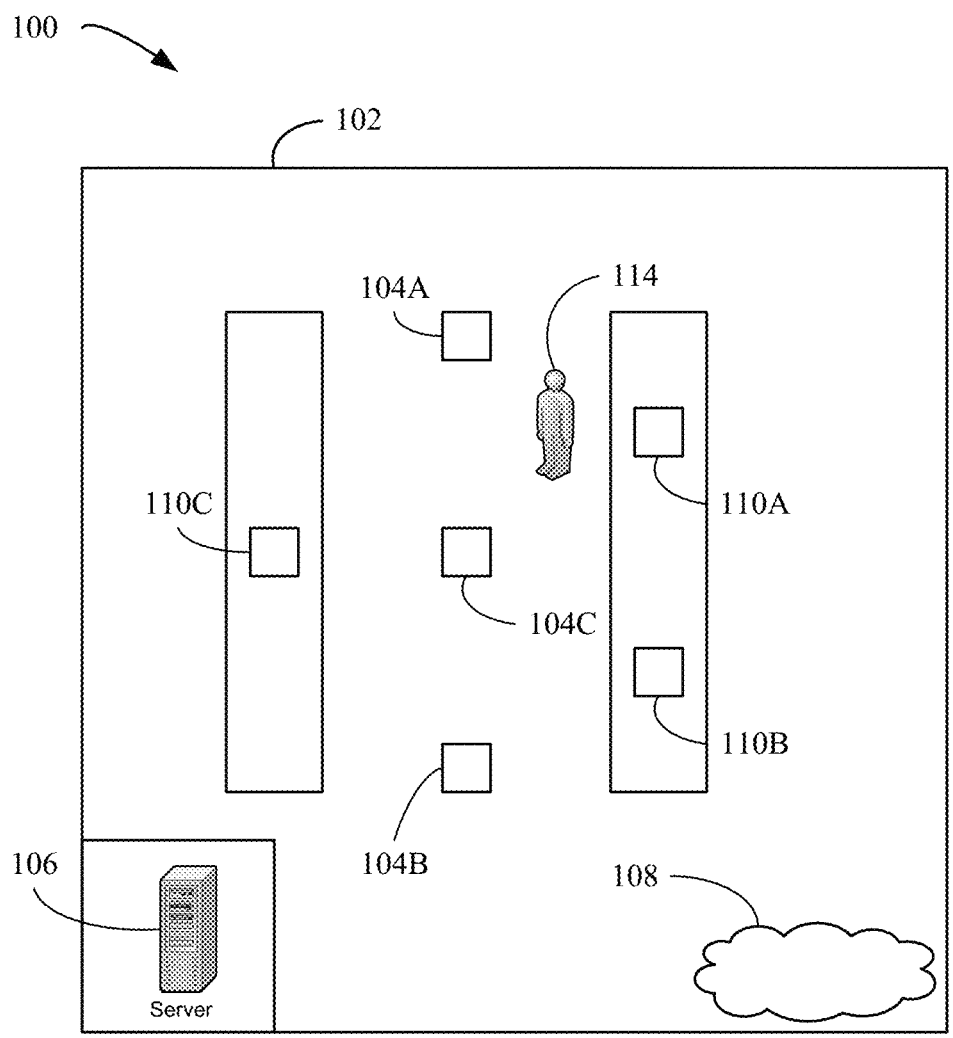
FIG. 1 shows an example operating environment consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

An image of an item, regardless of whether the item is covered by a hand or other object, may be used to determine a location of a customer within a store. For example, when items are placed on a shelf, their locations are known. Thus, when a user picks up an item, the location of the user can be determined. By knowing where the customer is located in the store, search queries and other targeted information may be supplied to the customer.

As disclosed herein, an image or images of an item may be passed to a deep convolutional autoencoder. The autoencoder may generate a front facing stock image of the item and generate a feature vector by extracting features of the one or more images. The feature vector may contain any number of features stored in an N-dimensional vector. For example, the autoencoder may generate a 128-dimensional feature vector that may store important internal properties of what is contained in the image.

Each of the items in the store may features stored in a database. For example, the database may include a plurality of known feature vectors. Each of the known feature vectors may be N-dimensional (e.g., a 128-dimensional vector). Thus, the feature vector generated from one or more images of a product may be queried against the database of known featured vectors for products located in the store.

Once a match is found, using a known location of the item a user picked up, the systems and methods disclose herein may identify the customer's location within the store based on the customer picking up the item. Stated another way, based on the customer picking up the item, the aisle and even the self the item is located on may be determined.

Based on the details of aisle and shelf information, other items on the shelf can be identify. Using the identity of the items on the shelf, targeted ads for similar items may be presented to a user. In addition, for frictionless stores, items the customer may eventually purchase may be narrowed to items in a particular aisle or on a particular shelf. The result, is that items to be searched for within the database of items within the store may be narrowed and thus, improve the efficiency of the search by narrowing the items to be searched.

FIG. 1 shows an example operating environment 100 consistent with this disclosure. As shown in FIG. 1, operating environment 100 may include a store 102. Within store 102 may be a first camera 104A, a second camera 104B, and a third camera 104C (collectively cameras 104) and a server 106. Cameras 104 may be in communications with server 106 via a network 108. Cameras 104 may be located to capture one or more images of items such as a first item 110A, a second item 110B, and a third item 110C (collectively items 110). Items 110 may be located on one or more shelves 112, such as a first shelf 112A and a second shelf 112B. While FIG. 1 shows only a few shelves, cameras, and items, any number of cameras, shelves, and items may be located within store 102.

As a customer 114 walks through store 102, cameras 104 may capture images of items customer 114 picks up or otherwise interacts with throughout store 102. For example, as customer 114 walks through store 102, he or she may pick up first item 110A. Cameras 104 may capture images of first item 110A from various angles in relation to one another. For example, first camera 104A and second camera 104B may capture images of the side of item 110A and third camera 104C may capture an image of the front of item 110A.

The captured images may be transmitted from cameras 110 to server 106. As disclosed herein, server 106 may perform an image analysis on the images and extract features from the images. For example, the various images may be processed to extract features from the front of the packaging for first item 110A. The front (or any portion of the packaging) may include features that may be extracted from the images of the packaging. For example, the packaging may include pictures of the item, text, specific colors for images and fonts, font types, font size, etc. Server 106 may extract the features from the various images and store the images in a feature vector.

During the extraction of the features, the images may be cropped to remove extraneous imagery. For example, server 106 may include software and a processor that allow server 106 to quickly determine background scenery using images of known background elements to filter the background elements and allow server 106 to crop the images.

Upon being received at server 106, the images may be processed by an encoder that may extract attributes about an item in the images. As disclosed herein, extracting attributes about the item 110A may include determining color, text written on packaging, etc. The number of attributed may be preset or may depend upon the images collected. For example, the number of attributes may be a set number such as 128. In another example, the number of attributes may be determined by the number of unique features that can be identified from the images. For instance, due to the customer's hand on the package a portion of text and a picture of the item may be partially covered. Thus, only a portion of the text and image may be uniquely identified from the images.

The attributes extracted from the images may be assigned an initial identification value and saved within an k-nearest neighbor (k-NN) database. As disclosed herein, the k-NN database may be saved on a memory of server 106 or may be stored offsite. The k-NN database may also store a plurality of known feature vectors for each item located in store 102.

While customer 114 walks through store 102, images of the items he or she picks up may be captured by cameras 104 and transmitted to server 106. Server 106 may use an encoder to extract features from the images and store them in a feature vector. The feature vector can be submitted to server 106 as a query. Server 106 may compare the feature vector to the plurality of known feature vectors to identify a match. Once a match is made, the location of customer 114 may be known because the known feature vector that matches the feature vector submitted as a query corresponds to an item, such as first item 110A, and the location, aisle and shelf, of the item is known.

As an example, the feature vector created by extracting the features of the images captured from cameras 104 may be assigned a temporary location value. The temporary location value may be based on camera ideas associated with each of cameras 104. For example, the location of each of cameras 104 may be known and may be used to get rough location of customer 114. The temporary location value and the feature vector created by extracting features from the images may be submitted to server 106 as a query. Server 106 may then determine which of the feature vectors stored in the k-NN database the feature vector associated with the temporary location value is closest to and thus determine which item customer 114 is holding and the location of customer 114.

As disclosed herein, cameras 104 may be located throughout store 102 and may be used to capture images of items 104 as customer 114 picks them up. Cameras 104 may be oriented at different angles to one another. Thus, cameras 104 may be able to capture images of items 104 at different angles. Images from different angles may be of different quality. As a result, different images may be better than others in terms of attributes that may be extracted. For example, a camera located directly above an item may capture better images than a camera located at the end of an aisle.

Using server 106 in conjunction with cameras 104 customer 114 can be tracked throughout store 102 by a determining what items 104 within store 102 customer 114 picks up. The departments visited and the items 104 customer 112 looks at or handles may be tracked and stored in a user profile. The user profile may be used to target ads, coupons, etc. to customer 114.

When customer 114 exits store 102 the any feature vectors created to track customer 114 and items he or she may have handled may be flushed from the k-NN database.

Below is an example of how images and feature vectors may be used to narrow down products customer 114 handles.

In a SQL database location details of products may be maintained. For example, the k-NN database may be maintained as a SQL database and may contain known feature vectors for each of the products, which may include known locations of each of the products.

PLU—definition of the items

LOCATION—definition of the locations. Multiple locations may be defined because the same product may be located in different parts of store 102.

PLU_LOCATIONS—link between the items and locations—each column may be the value of location defined in a location table.

Example pseudocode may be:

---

Define in LOCATION:
id=1; desc=Aisle
id=2; desc=Shelf
define in PLU_LOCATIONS:
item 17; location_id=1; LOCATION_PARAM_ID1 =1; LOCATION_PARAM_I2 =4
Each item can have several locations - several records in PLU_LOCATIONS table

---

The above pseudocode may mean item 17 is located in aisle 1 on shelf 4.

Assume there are 2000 products in store 102 for this example.

With using the systems and methods disclosed herein, instead of searching every product using image analysis or other methods, the search can be drilled down to 2K[*N]× 10[*N]

Where N is number of images of the same product took from different angles. 2K is total number of products available in the store. 10 is the number of products located on a shelf in this example.

Figure 2:
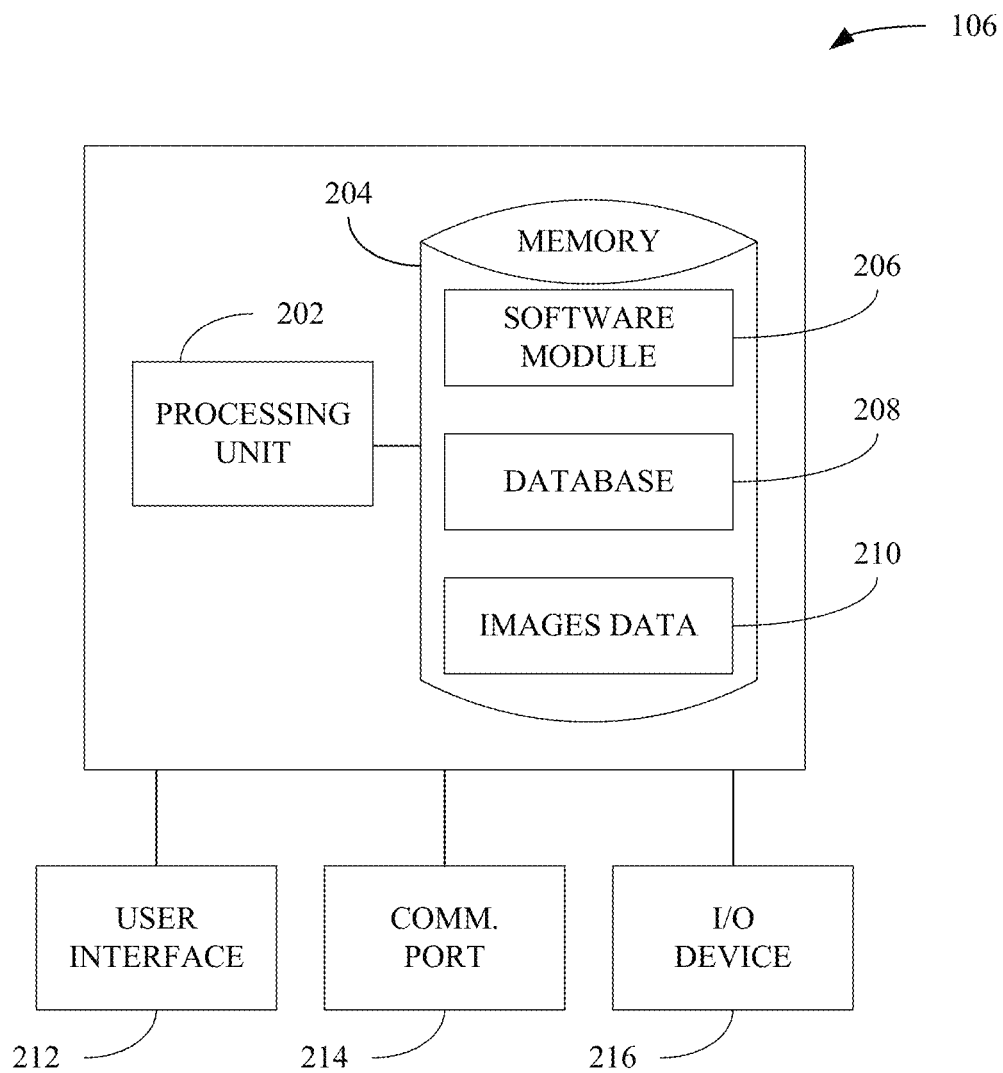
FIG. 2 shows an example schematic of a server consistent with this disclosure.

FIG. 2 shows an example schematic of server 106. As shown in FIG. 2, server 106 may include a processing unit 202 and a memory 204. The memory 204 may include a software module 206, a database 208, and images data 210. While executing on processing unit 202, the software module 206 may perform processes for determining a customer's location, including, for example, one or more stages included in a method 300 described below with respect to FIG. 3. Server 106 may also include a user interface 212, a communications port 214, and an input/output (I/O) device 216.

As disclosed herein, database 208 may include a plurality of feature vectors. The feature vectors may be created by an encoder that may be part of software module 206. The feature vectors may include the various features for items and features that are extracted from a plurality of images as disclosed herein. The feature vectors may have the same dimensions or may have different dimensions. For example, the feature vectors for the products located in store 112 may all have the same dimensions. Feature vectors generated by the encoder for each item that customer 114 picks up may have differing dimensions depending on the number of attributes the encoder is able to extract from the images captures via cameras 104.

Images data 210 may include the images captured by cameras 104 and data associated with those images. For example, images data 210 may include the images, data that identifies the camera that captured each of the images, a time stamp for each image, and location values. The data that identifies the camera that captured each of the images, may also include an angle the camera that captured an image is oriented to relative to an item captured in the image and a location of the camera within a store.

User interface 212 can include any number of devices that allow a user to interface with server 106. Non-limiting examples of user interface 212 include a keypad, a microphone, a display (touchscreen or otherwise), etc.

Communications port 214 may allow server 106 to communicate with various information sources and devices, such as, but not limited to, remote computing devices, mobile devices, peripheral devices, etc. Non-limiting examples of communications port 214 include, Ethernet cards (wireless or wired), Bluetooth® transmitters and receivers, near-field communications modules, etc. User interface 212 may also use communications port 214 to communicate with server 106. For example, user interface 212 may be a tablet computer that includes a virtual keyboard that communicates with server 106 via communications port 214.

I/O device 216 may allow server 106 to receive and output information. Non-limiting examples of I/O device 216 include, a camera (still or video such as cameras 104), a weight detection device such as a scale, a printer for printing receipts and packing lists, a scanner, etc.

Figure 3:
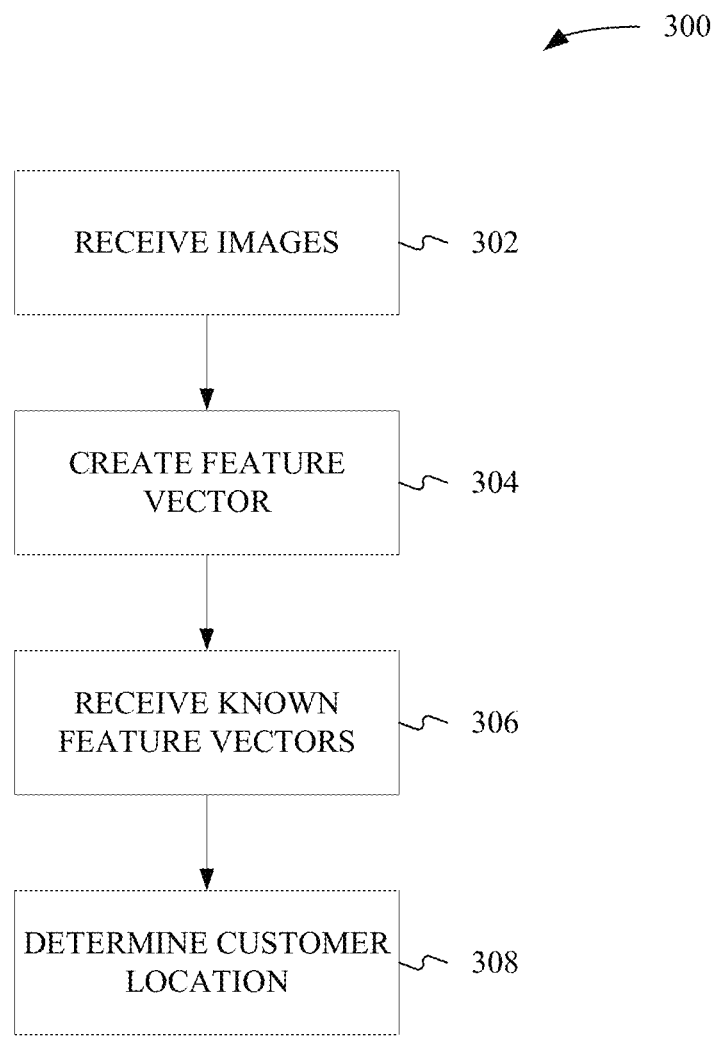
FIG. 3 shows an example method consistent with this disclosure.

FIG. 3 shows an example method 300 consistent with this disclosure. Method 300 may begin at stage 302 where at least one image may be received. For example, cameras, such as cameras 104, may capture images of an item, such as a product handled by the customer within a store, such as store 102, and transmit the images to a server, such as server 106.

From stage 302 method 300 may proceed to stage 304 where a feature vector may be created. For instance, server 106 may use known images of the background to remove background elements from the images and crop the images. In addition, the server 106 may use object character recognition to read labels on products customer 112 may be holding. Server 106 may also use image analysis, pattern recognition, etc. to determine colors of the packaging, extract information such as characters or trademarks that may be printed on the packaging. As disclosed herein, the feature vector may be an N dimensional vector where each dimension represents a unique attribute.

From stage 304 method 300 may proceed to stage 306 where known feature vectors may be received. For example, feature vectors for items in store 102 may be received from a local data source, such as a server located within store 102, or from a remote data source, such as a server located offsite from store 102. Receiving the know feature vectors may also include receiving a subset of know feature vectors. For instance, using a camera ID associated with the received images, certain products within the store may be eliminated because those items are not located within view of the cameras that captured the images. As a result, instead of server 106 having to search through all known feature vectors, server 106 may receive a subset of known feature vectors or otherwise eliminate at least one of the known feature vectors.

From stage 306 method 300 may proceed to stage 308 where a location of customer 114 may be determined. For example, customer's 114 location may be determined using the feature vector created in stage 304 and the known feature vectors received in stage 306. Determining the location of the user may include matching the feature vector created in stage 304 to the closest of the known feature vectors received in stage 306. Because the known feature vectors include a location of each item in store 102, once a feature vector is matched to a known feature vector, the location of the item is known and thus, the location of customer 114, who is holding the item, is known.

Matching the feature vector to a known feature vector may be accomplished by submitting the feature vector as a query to a k-NN database, such as database 208. Querying the k-NN database may include passing a feature vector containing attributes extracted from one or more images. This feature vector may be passed to the k-NN database and compared with other feature vectors stored within the k-NN database. The comparison of the feature vectors may result in the feature vector that was submitted as part of the query being closest to one of the known feature vectors stored in the k-NN database. The identity of the item would then be assigned to the identity of the nearest neighbor in the k-NN database.

For instance, suppose there are 2000 items in store 102 thus, there would be 2000 feature vectors saved in the k-NN database and each of the 2000 known feature vectors include attributes for the 2000 items within the store. When new images are taken of the items held by customer 114, say in the produce section of the store, attributes from those images may be extracted and stored as a new feature vector, which is then passed to the k-NN database as a query. Server 106 will then determine which of the 2000 known feature vectors saved in the k-NN database the new feature vector is closest too. The identity of whichever of the 2000 known feature vectors the new feature vector is closest too will be assigned as the identity of the item and the location of customer 114 will be known because the location of the items is saved as part of each of the known feature vectors. Part of the query process may include determining a Euclidean distance between the new feature vector and the vectors stored in the k-NN database. The shortest distance may be used to select the item the customer is holding.

In another example, determining the location of the customer may include using the camera ID to first filter known images in a database using the camera ID. For example, the camera ID may correspond to a particular aisle and/or shelf of a store. Thus, the known images stored in the database can be filtered so that images not located in the particular aisle and/or shelf are removed from the comparison. Once the known images are filtered then a matching function and the feature vector and the known feature vectors may be used to determine which of the filtered known images corresponds to the image of the product the customer is holding received from the cameras. The results from the matching function may include a ranking of the known images or a weight assigned to the known images. The results may be sorted by weight etc. and the item the customer is holding may be identified as the known image with the highest weight, or other metrics from the sorting process. Once a known image is identified as the item the customer is holding the location of the customer is known from the known location associated with the known image.

Examples

Example 1 is a method for determining a location of a customer within a store, the method comprising: receiving at least one image of an item located in the store, the item being held by the customer; creating a feature vector, the feature vector storing features of the at least one image of the item; and determining the location of the customer using features stored in the feature vector.

In Example 2, the subject matter of Example 1 optionally includes wherein determining the location of the customer using the feature vector includes comparing the feature vector to a known feature vector.

In Example 3, the subject matter of Example 2 optionally includes receiving the known feature vector from a remote data source.

In Example 4, the subject matter of any one or more of Examples 2-3 optionally include receiving the known feature vector from a local data source.

In Example 5, the subject matter of any one or more of Examples 2-4 optionally include eliminating at least one of a plurality of known feature vectors based on at least one feature stored in the feature vector.

In Example 6, the subject matter of any one or more of Examples 2-5 optionally include selecting a subset of a plurality of known feature vectors for using in determining the location of the customer.

In Example 7, the subject matter of any one or more of Examples 1-6 optionally include wherein the at least one images of the item includes at least two images of the item, the at least two images of the items captured at different angles relative to one another, and wherein creating the feature vector includes extracting the features from the at least two images of the item.

In Example 8, the subject matter of any one or more of Examples 1-7 optionally include wherein determining the location of the customer includes determining which shelf from a plurality of shelves the customer is standing proximate to using the features stored in the feature vector.

In Example 9, the subject matter of any one or more of Examples 1-8 optionally include wherein at least one of the features stored in the feature vector includes text printed on a package of the item.

In Example 10, the subject matter of any one or more of Examples 1-9 optionally include wherein at least one of the features stored in the feature vector includes a camera identifier associated with a camera that captured each of the at least one image of the item.

Example 11 is a system for determining a location of a customer within a store, the system comprising: a processor; and a memory storing instructions that, when executed by the processor, cause the processor to: receive at least one image of an item located in the store, the item being held by the customer; create a feature vector, the feature vector storing features of the at least one image of the item; and determine the location of the customer using features stored in the feature vector.

In Example 12, the subject matter of Example 11 optionally includes wherein determining the location of the customer using the feature vector includes additional instructions that, when executed by the processor, cause the processor to compare the feature vector to a known feature vector.

In Example 13, the subject matter of Example 12 optionally includes wherein the instructions, when executed by the processor, further cause the processor to receive the known feature vector from a remote data source.

In Example 14, the subject matter of any one or more of Examples 12-13 optionally include wherein the instructions, when executed by the processor, further cause the processor to receive the known feature vector from a local data source.

In Example 15, the subject matter of any one or more of Examples 12-14 optionally include wherein the instructions, when executed by the processor, further cause the processor to eliminate at least one of a plurality of known feature vectors based on at least one feature stored in the feature vector.

In Example 16, the subject matter of any one or more of Examples 12-15 optionally include wherein the instructions, when executed by the processor, further cause the processor to select a subset of a plurality of known feature vectors for using in determining the location of the customer.

In Example 17, the subject matter of any one or more of Examples 11-16 optionally include wherein the at least one images of the item includes at least two images of the item, the at least two images of the items captured at different angles relative to one another, and wherein creating the feature vector further includes additional instructions that, when executed by the processor, cause the processor to extract the features from the at least two images of the item.

In Example 18, the subject matter of any one or more of Examples 11-17 optionally include wherein determining the location of the customer includes additional instructions that, when executed by the processor, cause the processor to determine which shelf from a plurality of shelves the customer is standing proximate to using the features stored in the feature vector.

In Example 19, the subject matter of any one or more of Examples 11-18 optionally include wherein at least one of the features stored in the feature vector includes text printed on a package of the item.

In Example 20, the subject matter of any one or more of Examples 11-19 optionally include wherein at least one of the features stored in the feature vector includes a camera identifier associated with a camera that captured each of the at least one image of the item.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

Claimed is:

1. A method for determining a location of a customer within a store, the method comprising:
    receiving at least one image of an item located in the store, thy: item being held by the customer;
    creating a feature vector, the feature vector storing features of the at least one image of the item; and
    determining the location of the customer using features stored in the feature vector.

2. The method of claim 1, wherein determining the location of the customer using the feature vector includes comparing the feature vector to a known feature vector.

3. The method of claim 2, further comprising receiving the known feature vector from a remote data source.

4. The method of claim 2, further comprising receiving the known feature vector from a local data source.

5. The method of claim 2, further comprising eliminating at least one of a plurality of known feature vectors based on at least one feature stored in the feature vector.

6. The method of claim 2, further comprising selecting a subset of a plurality of known feature vectors for using in determining the location of the customer.

7. The method of claim 1, wherein the at least one images of the item includes at least two images of the item, the at least two images of the items captured at different angles relative to one another, and wherein creating the feature vector includes extracting the features from the at least two images of the item.

8. The method of claim 1, wherein determining the location of the customer includes determining which shelf from a plurality of shelves the customer is standing proximate to using the features stored in the feature vector.

9. The method of claim 1, wherein at least one of the features stored in the feature vector includes text printed on a package of the item.

10. The method of claim 1, wherein at least one of the features stored in the feature vector includes a camera identifier associated with a camera that captured each of the at least one image of the item.

11. A system for determining a location of a customer within a store, the system comprising:
a processor; and
a memory storing instructions that, when executed by the processor, cause the processor to:
receive at leak one image of an item located in the store, the item being held by the customer;
create a feature vector, the feature vector storing features of the at least one image of the item; and
determine the location of the customer using features stored in the feature vector.

12. The system of claim 11, wherein determining the location of the customer using the feature vector includes additional instructions that, when executed by the processor, cause the processor to compare the feature vector to a known feature vector.

13. The system of claim 12, wherein the instructions, when executed by the processor, further cause the processor to receive the known feature vector from a remote data source.

14. The system of claim 12, wherein the instructions, when executed by the processor, further cause the processor to receive the known feature vector from a local data source.

15. The system of claim 12, wherein the instructions, when executed by the processor, further cause the processor to eliminate at least one of a plurality of known feature vectors based on at least one feature stored in the feature vector.

16. The system of claim 12, wherein the instructions, when executed by the processor, further cause the processor to select a subset of a plurality of known feature vectors for using in determining the location of the customer.

17. The system of claim 11, wherein the at least one images of the item includes at least two images of the item, the at least two images of the items captured at different angles relative to one another, and wherein creating the feature vector further includes additional instructions that, when executed by the processor, cause the processor to extract the features from the at least two images of the item.

18. The system of claim 11, wherein determining the location of the customer includes additional instructions that, when executed by the processor, cause the processor to determine which shelf from a plurality of shelves the customer is standing proximate to using the features stored in the feature vector.

19. The system of claim 11, wherein at least one of the features stored in the feature vector includes text printed on a package of the item.

20. The system of claim 11, wherein at least one of the features stored in the feature vector includes a camera identifier associated with a camera that captured each of the at least one image of the item.

* * * * *